US009663047B2

(12) United States Patent
Bande Martínez et al.

(10) Patent No.: US 9,663,047 B2
(45) Date of Patent: May 30, 2017

(54) METHOD AND SYSTEM FOR INFERRING THE BEHAVIOR OR STATE OF THE DRIVER OF A VEHICLE, USE OF THE METHOD AND COMPUTER PROGRAM FOR CARRYING OUT THE METHOD

(75) Inventors: Daniel Bande Martínez, Barcelona (ES); Ariadna Bartra Cisa, Esplugues de Llobregat (ES); Mireya Fernández Chimeno, Barcelona (ES); Santiago Marco Colás, Barcelona (ES); Juan Ramos Castro, Barcelona (ES)

(73) Assignee: FICO Mirrors, S.A., Barcelona (ES)

( * ) Notice: Subject to any disclaimer, the term of this patent is extended or adjusted under 35 U.S.C. 154(b) by 102 days.

(21) Appl. No.: 14/376,020

(22) PCT Filed: Feb. 1, 2012

(86) PCT No.: PCT/ES2012/000024
§ 371 (c)(1),
(2), (4) Date: Oct. 8, 2014

(87) PCT Pub. No.: WO2013/113947
PCT Pub. Date: Aug. 8, 2013

(65) Prior Publication Data
US 2015/0029014 A1    Jan. 29, 2015

(51) Int. Cl.
*B60Q 1/00*       (2006.01)
*B60R 16/023*     (2006.01)
(Continued)

(52) U.S. Cl.
CPC .......... *B60R 16/0232* (2013.01); *G08B 21/02* (2013.01); *G08B 21/06* (2013.01); *G08B 21/18* (2013.01)

(58) Field of Classification Search
CPC ... B60R 16/0232; B60R 16/023; G08B 21/02; G08B 21/06; G08B 21/18
(Continued)

(56) References Cited

U.S. PATENT DOCUMENTS

| 7,138,922 | B2 | 11/2006 | Strumolo |
| 7,187,292 | B2 | 3/2007 | Hayashi |

(Continued)

FOREIGN PATENT DOCUMENTS

| EP | 2 299 355 A2 | 3/2011 |
| ES | 2 254 526 T3 | 10/1981 |

(Continued)

*Primary Examiner* — Eric M Blount
(74) *Attorney, Agent, or Firm* — Robert J. Hess; Hess Patent Law Firm

(57) ABSTRACT

The invention relates to a method and system for inferring the behavior or state of the driver of a vehicle, use of the method and computer program for carrying out the method The method comprises evaluating a series of descriptive functions of the conditions of interaction of the driver with the vehicle based at least on information from inertial sensors of an autonomous computation device, by comparing such evaluation with reference information associated with a behavior of the driver that is considered normal.

The system is suitable for implementing the method of the invention.

The use is for detecting behavioral changes of a driver.

The computer program is suitable for performing the steps of the method of the invention.

24 Claims, 4 Drawing Sheets

(51) Int. Cl.
*G08B 21/06* (2006.01)
*G08B 21/02* (2006.01)
*G08B 21/18* (2006.01)

(58) Field of Classification Search
USPC .............................. 340/438, 439, 575, 576
See application file for complete search history.

(56) References Cited

U.S. PATENT DOCUMENTS

| | | | |
|---|---|---|---|
| 7,301,465 B2 | 11/2007 | Tengshe | |
| 7,649,445 B2 | 1/2010 | Kuramori | |
| 8,630,768 B2 * | 1/2014 | McClellan | G01S 5/0027 340/439 |
| 2002/0120374 A1 * | 8/2002 | Douros | G09B 9/052 340/439 |
| 2004/0054452 A1 * | 3/2004 | Bjorkman | A61B 5/18 701/31.4 |
| 2006/0287787 A1 * | 12/2006 | Engstrom | G01C 21/26 701/36 |
| 2008/0036580 A1 * | 2/2008 | Breed | B60R 21/01536 340/438 |

FOREIGN PATENT DOCUMENTS

| | | |
|---|---|---|
| WO | WO 2007/112169 | 10/2007 |
| WO | WO 2013/113947 A1 | 8/2013 |

\* cited by examiner

METHOD AND SYSTEM FOR INFERRING THE BEHAVIOR OR STATE OF THE DRIVER OF A VEHICLE, USE OF THE METHOD AND COMPUTER PROGRAM FOR CARRYING OUT THE METHOD

FIELD OF THE ART

The present invention generally relates, in a first aspect, to a method for inferring the behavior or state of the driver of a vehicle with the aid of an autonomous computation device integrating sensors, and more particularly to a method comprising evaluating a series of descriptive functions of the conditions of interaction of the driver with the vehicle based at least on information from inertial sensors of the autonomous computation device.

A second aspect of the invention relates to using a method according to the first aspect for detecting behavioral changes of a driver.

A third aspect of the invention relates to a system suitable for implementing the method of the first aspect.

A fourth aspect of the invention relates to a computer program suitable for performing the steps of the method of the first aspect.

PRIOR ART

ES2254526T3 proposes a method and apparatus which, for some embodiments, is formed by a mobile telephone with access to any type of sensors (light, temperature, movement, speed, date, time and location sensors) which can be integrated in the same mobile telephone and/or can be external sensors wirelessly communicated with the mobile telephone.

The operating state of the vehicle, the state or state of the operator, such as fatigue and the level of distraction, (by analyzing the blinking speed detected by means of video sensors, corrections in the direction of the vehicle, etc.), the level of activity of the operator and of the environment are detected by means of the proposal of ES2254526T3. The objective is to show prioritized information to the operator depending on the detections made, this information including alarm signals.

EP2299355 describes a method and system for communication and interaction between a driver and a plurality of applications, depending on a series of parameters detected by means of corresponding sensors, including sensors for detecting the state of the driver, the state of the vehicle, environmental sensors, position sensors, sensors for detecting drowsiness, etc. The applications are integrated in modules of the vehicle itself, added to the vehicle or included in mobile telephones.

By way of example, sensors for detecting the state of the vehicle include accelerometers, speed sensors, pedal position sensors, steering wheel sensors, gyroscopes, tire pressure sensors, etc. EP2299355 does not indicate the use of sensors included in mobile telephones.

U.S. Pat. No. 7,301,465B2 proposes a drowsiness alarm system which includes two modules: a monitoring module worn by the driver and an indicator module, which are wirelessly communicated to one another.

The indication module can be a mobile telephone, such as an iPOD, and incorporates drowsiness detection software. The monitoring module has a camera used for example to examine the driver's pupil, as well as other sensors, including a compass to detect, for example, if the driver is not looking at the road.

U.S. Pat. No. 7,301,465B2 mentions neither sensors for detecting the state of the vehicle nor that the indicator module has sensors.

U.S. Pat. No. 7,138,922B2 proposes a drowsiness alarm system combining physiological sensors with others, such as a lane departure sensor, as well as a communication device, such as a mobile telephone, which is controlled depending on the detections made. In this case the mobile telephone is used only as a communication device, not as a sensor information processor.

WO2007112169 describes a drowsiness detection system using a mobile telephone with a camera to monitor the face of the driver. It also uses information about the state of the vehicle received through the vehicle data bus, as well as information about the area (traffic, weather) received over the Internet for example.

U.S. Pat. No. 7,649,445B2 proposes a system combining physiological data with vehicle driving data to evaluate driving skills. It mentions neither drowsiness nor using a mobile telephone or the like as part of the system.

U.S. Pat. No. 7,187,292B2 proposes a physiological sensor worn by the driver and communicated (for example wirelessly) with a receiving unit informing the driver of his/her state (in addition to performing other functions), one of which can be fatigue.

DESCRIPTION OF THE INVENTION

A first aspect of the invention relates to a method for inferring the behavior or state of the driver of a vehicle with the aid of an autonomous computation device located in the vehicle, integrating sensors that can report on the motion and operating state of the vehicle, and differing from the proposals of the state of the art in that said sensors are inertial sensors comprising accelerometers and/or gyroscopes and where the method comprises:
  a) processing at least part of the information from one or several of said inertial sensors of said autonomous computation device, one by one or in combination, to evaluate at least one descriptive function of the interaction or behavior of the driver with the vehicle over time, in each phase of a trajectory and for a specific road; and
  b) predicting said behavior or state by comparing the evaluation of said at least one descriptive function, or at least a value thereof, with reference information associated with a behavior of the driver that is considered normal for a specific road, said reference information being stored in at least one memory of said autonomous computation device, or in a remote device or database.

For one embodiment, said reference information comprises reference values obtained by evaluating said descriptive function in characterization periods and in zones in which specific conditions relating to speed of the vehicle and/or radius of curvature are met, comprising performing said comparison of step b) of the evaluation of said descriptive function in step a) and said reference values.

According to one embodiment, said reference information comprises reference values, the method comprising performing said comparison of step b) of the value of said descriptive function and said reference values.

According to another embodiment, step a) comprises obtaining a plurality of descriptive functions and step b) comprises comparing the evaluation thereof with said reference information.

For another embodiment, said descriptive function is a combined descriptive function, the method comprising evaluating it in step a) combining a plurality of individual descriptive functions.

The descriptive function is, depending on the embodiment, at least one of those included in the following non exhaustive list: standard deviation of the lateral position of the car, entropy of the lateral deviation, number of zigzags, frequency of zigzags, maximum lateral speed, mean lateral speed, maximum acceleration in the direction of motion, mean speed, maximum speed variation, number of peaks in angular acceleration and number and intensity of pitches and rolls, or a combination thereof.

For one embodiment, the method comprises determining that the behavior of the driver of the vehicle is abnormal if the result of said comparison of step b) offers at least one discrepancy greater than a specific discrepancy value and generating a warning alarm signal if a discrepancy log shows an abnormal driving interval frequency greater than a specific frequency.

For several embodiments, the method comprises sending the warning alarm signal to the driver and/or to a remote control center where it is collected in a selectively accessible database together with at least trajectory and date data. The autonomous computation device can additionally send the alarm to another communication device of the vehicle to send it to the control center.

With respect to the autonomous computation device, depending on the embodiment, said device is a device with telecommunication capacity, selected from a mobile telephone, a personal digital assistant or a navigation device or a TCU (telecommunications unit of the vehicle), or an equivalent device.

According to one embodiment, the method comprises the autonomous computation device receiving information from at least one of the following additional sensors: receiver/locator based on a global navigation satellite system, temperature sensor, sensor associated with speed, compass, sensor associated with detecting radii of curvature, sensor associated with detecting lane width, sensor associated with detecting the quality and/or type of road, altitude sensor, video camera integrated in the autonomous computation device for detecting the biological constants of the user, sensor associated with a system for detecting obstacles or lane departure or a combination thereof.

For one variant of said embodiment, the autonomous computation device comprises said additional sensors.

For another variant of said embodiment, said additional sensors are external to the autonomous computation device, and the method comprises the autonomous computation device receiving said information from the mentioned additional sensors through a telematic means using said telecommunication capacity, or establishing a connection with a communications network of the vehicle.

According to one embodiment of the method proposed by the first aspect, said determination of the behavior or state of the driver is inferred by additionally taking into account the processing of physiological information of the driver.

For one embodiment, the method comprises obtaining said physiological information of the driver through at least one physiological sensing device, said physiological sensing device being in contact with or close to the driver and selected from: a contact sensor comprising an inductive band, piezoelectric band or resistive band, electrodes, temperature sensor, or a contactless sensor comprising a resistive device integrated in the vehicle seat belt, a bioimpedance sensor or array of bioimpedance sensors, a camera aiming the user to detect his/her biological constants or a radar device.

For one embodiment, the autonomous computation device and the physiological sensor or sensors, or an electronic system connected thereto, have wireless communication capacity, the method comprising wirelessly acquiring by means of the autonomous computation device said physiological information of the driver from said physiological sensor or sensors or from said electronic system connected thereto, and where said physiological sensor incorporates a driver movement and/or vibration compensation module.

According to one embodiment, the method comprises:
comparing said information about the physiological state of the driver with reference values relating to a physiological state of the driver associated with a behavior of the driver that is considered normal, said reference values being stored in a memory of the physiological sensing device, in a memory of the autonomous computation device, or in a remote device, and
establishing that the behavior of the driver of the vehicle is abnormal if the result of said comparison of information about the physiological state of the driver offers at least one discrepancy greater than a specific discrepancy value and generating a warning alarm signal at least for the driver if it is determined that the behavior of the driver of the vehicle is abnormal.

According to the method of the first aspect, for one embodiment, a warning signal is generated as a result of a joint evaluation of the information from the inertial sensors of the autonomous device, and/or from the physiological (contact or contactless) sensors or from the additional sensors.

For one embodiment, the method comprises generating said reference values relating to operating states of the vehicle and/or said reference values relating to a physiological state of the driver by means of an initial characterization process comprising a user providing an indication of data about his/her state at a specific time and habits through an input of the autonomous computation device, or by means of the inclusion thereof by default in a computer program installed in the autonomous device, or through a database or a sensor associated with the user, comprising several previously established states, and performing said generation of values for each of a plurality of drivers and/or driving profiles and/or operating environments comprising data about the road being traveled on.

For another further embodiment of the method of the invention, the coherence of the data entered by a user is checked against the behavior of said user inferred through the dynamics and/or operating state of the vehicle or his/her biological data during a check period having a predetermined duration.

A further embodiment of the method of the first aspect of the invention comprises the autonomous computation device determining the operating environment of the vehicle from at least the information received by said and/or other sensors and/or by means of a user providing an indication through an input device of the autonomous computation device, or by information relating to the road being traveled on stored in said autonomous computation device or received from an external storage device.

Examples of possible operating environments can include the following: "static environment" if is detected that the autonomous computation device does not move and only receives biological data, "dynamic environment 1" if the autonomous computation device is traveling on a straight road, "dynamic environment 2" if it is traveling on an inclined road, "dynamic environment 3" if it is traveling on a road with bends, etc.

For carrying out said determination of the behavior or state of the driver, the method comprises using additional information about the environment that can affect the behavior of the driver, chosen from at least one of the following types of information: time of day, weather conditions and light information. Said additional information about the environment is accessed by the autonomous computation device through internal sensors, external sensors and/or said information is from a remote point accessible through communication means of the autonomous computation device.

According to another embodiment, the method comprises performing a prior step of calibrating at least the internal sensors of the autonomous computation device which is described in detail in a later section for several embodiments.

According to one embodiment, if during the normal operating mode the autonomous computation device identifies that one or more of the sensors provides values outside those expected, the descriptive functions depending on that sensor are temporarily assigned a lower weight in relation to the dynamics and/or operating state of the vehicle that the respective sensor is reporting about.

For one embodiment, the autonomous computation device is fixed to a structure of the interior of the vehicle cabin chosen from the dashboard of the vehicle or a pillar thereof which reduces vibrations, such that it is very rigidly fixed to the structure of the vehicle so that it can pick up the movements of the dynamics of the vehicle as exactly as possible and the effects of the vibrations are minimal. It must be mentioned that in some vehicles internal accelerometers are not precise enough to allow performing this function.

An algorithm checking the rigidity of said fixing in one of its steps will be described in detail in a later section for several embodiments.

A second aspect of the invention relates to using a method according to the first aspect for detecting behavioral changes of a driver, including: drowsiness, distraction, stressed states, states of inebriation or under the influence of drugs, using different physiological variables chosen from heart rate, breathing, perspiration and the dynamics and/or operating state of the vehicle.

A third aspect of the invention relates to a system for inferring the behavior of the driver of a vehicle, comprising an autonomous computation device arranged in the vehicle with:
 processing means; and
 internal sensors connected with said processing means and arranged to detect the dynamics of the vehicle and to supply information relating to said state of the vehicle to said processing means.

Unlike conventional systems, in the system proposed by the third aspect of the invention:
 the autonomous computation device comprises a memory where at least reference information relating to states of the vehicle associated with a behavior of the driver that is considered normal is recorded; and
 said processing means are communicated with said memory to access said reference information, and they implement the method of the first aspect of the invention.

For one embodiment, the system comprises at least one physiological sensor associated with the driver of the vehicle, intended for detecting a physiological state of the driver and supplying information relating to said physiological state to said autonomous computation device, and where said autonomous computation device and said physiological sensor, or an electronic system connected thereto, have wireless communication capacity, said physiological sensor or said electronic system connected thereto being intended for supplying said information relating to said physiological state to said autonomous computation device wirelessly.

A fourth aspect of the invention relates to a computer program comprising computer program code means suitable for performing the steps of the method of the first aspect of the invention, including said evaluation of the descriptive functions of the interaction of the driver with the vehicle, in each phase of a trajectory and the treatment of the information about the physiological state of the driver and said determination of the behavior or state of the driver of the vehicle when the aforementioned program is run in a computer, a digital signal processor, an application-specific integrated circuit, a microprocessor, a microcontroller or any other form of programmable hardware.

BRIEF DESCRIPTION OF THE DRAWINGS

The foregoing and other advantages and features will be more fully understood from the following detailed description of several embodiments with reference to the attached drawings, which must be considered as illustrative and non-limiting, in which.

DETAILED DESCRIPTION OF SEVERAL EMBODIMENTS

Figure 1:
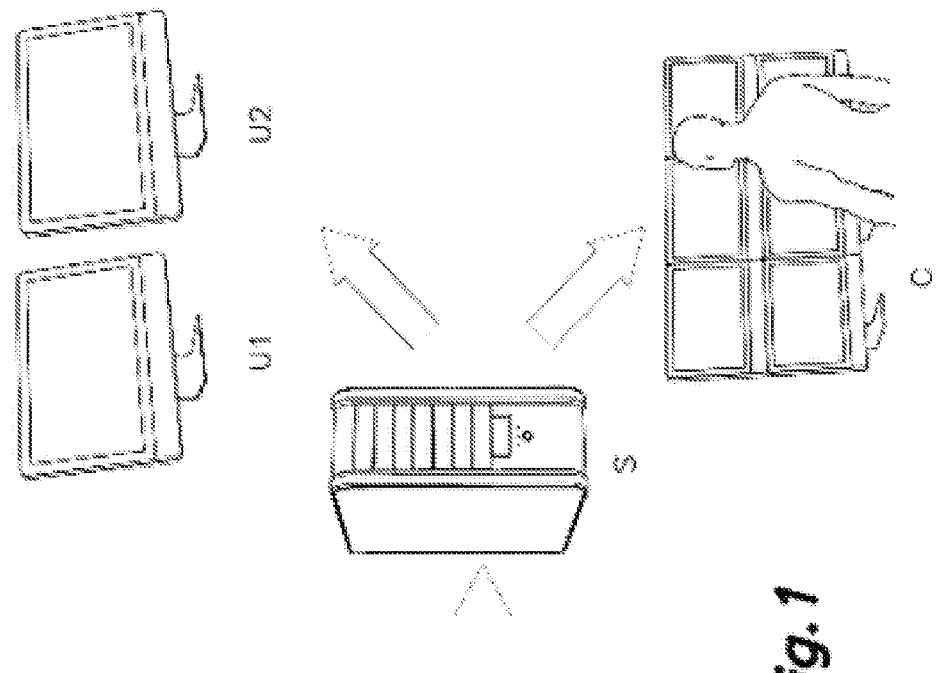
FIG. 1 schematically shows different elements included in the system of the third aspect of the invention for one embodiment.
Figure 1:
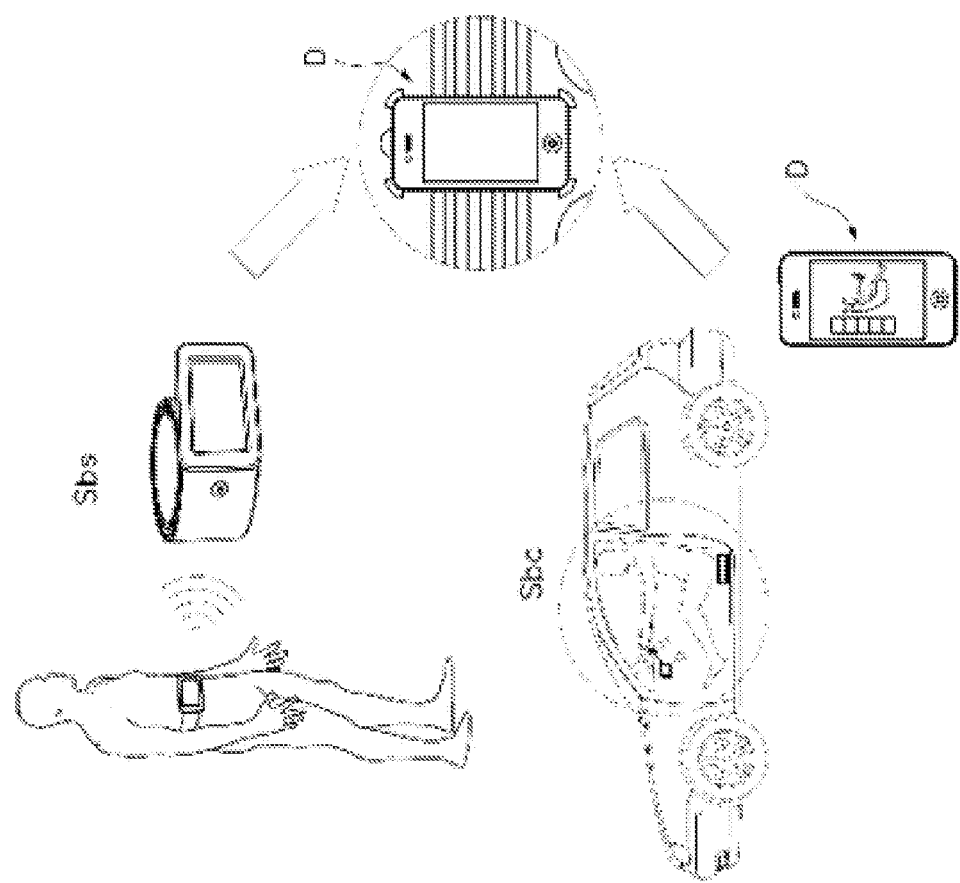

FIG. 1 shows the system proposed by the third aspect of the invention for one embodiment for which the autonomous computation device D receives information from contact biological sensors Sbs, such as the plethysmographic band shown, from contactless biological sensors Sbc, such as the one included in the steering wheel of the vehicle shown which is communicated wirelessly with the module or electronic system included in the driver's seat, and from internal sensors inside the device D (not shown), such as those forming a three-axis gyroscope, an accelerometer, a proximity sensor and an environmental light sensor, which supply information that is used, as described above for a number of embodiments, for inferring the behavior or state of the driver of a vehicle according to the method of the first aspect of the invention.

The number and type of sensors is not limited to that shown, both in relation to biological sensors and to the internal sensors of the device D, being able to use, for example, in relation to the biological sensors, any type of known sensor for detecting breathing, heart rate, or any other physiological parameter of interest, such that a state of the driver that may affect driving, such as drowsiness, can be detected.

For the embodiment of FIG. 1, the autonomous computation device D processes the information received from the different sensors and determines as a result (by implementing the method of the first aspect) if the behavior of the driver of the vehicle is abnormal, in which case a warning alarm signal is generated and sent to the driver (for example through his/her own autonomous computation device D) and/or to a server S accessed by a remote control center C and/or different computer terminals U1, U2 of the user or users.

Additionally, according to one type of embodiment not shown in the drawing, the wireless terminal could send the alarm signal to another telecommunications unit for transmitting the data to the remote control center.

In addition to said alarm signal, according to one embodiment, the device D sends to the server S part or all of the processed information and the result of said processing, such that both in the control center C and in the terminals U1, U2 said information can be analyzed and actions be taken accordingly.

The display of the autonomous computation device D of FIG. 1 graphically shows, for the embodiment shown, the attention state of the driver as a result of said processing of the information from the sensors, in the form of a series of bars that light up or change color in a higher or lower number depending on such attention state.

Figure 2B:
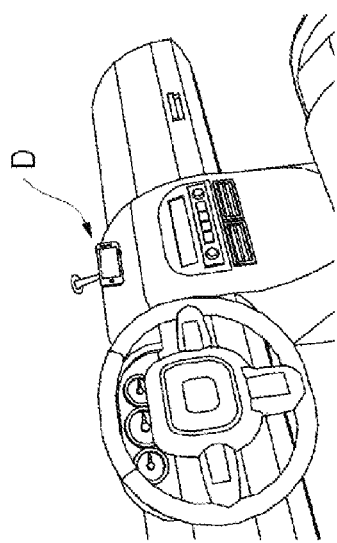
FIGS. 2a to 2d show different assembly alternatives in a structure of the interior of a vehicle cabin, of the autonomous computation device of the system and the method of the invention.
Figure 2D:
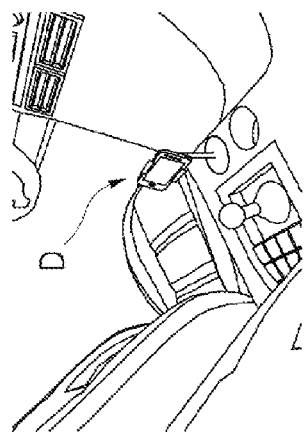
Figure 2A:
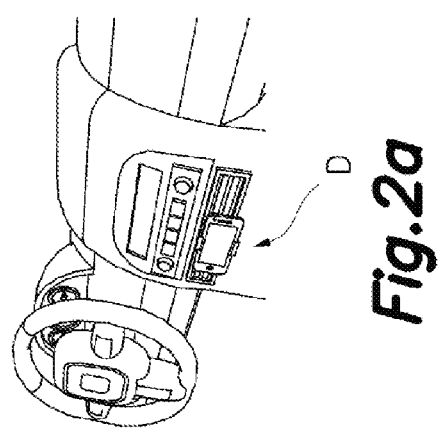
Figure 2C:
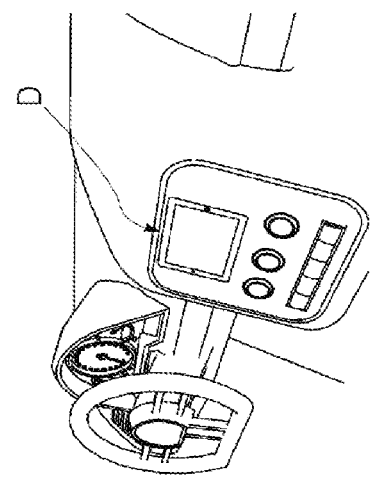

FIGS. 2a to 2d show different assembly alternatives of the autonomous computation device D by means of fixing it to a structure of the interior of the vehicle cabin, FIG. 2a showing the case when the device D is assembled by means of a support to the front of the vehicle, FIG. 2b showing it assembled on the front windshield, FIG. 2c showing it assembled by means of a support integrated in the vehicle and FIG. 2d showing it assembled by means of a support to a cup holder.

Figure 3:
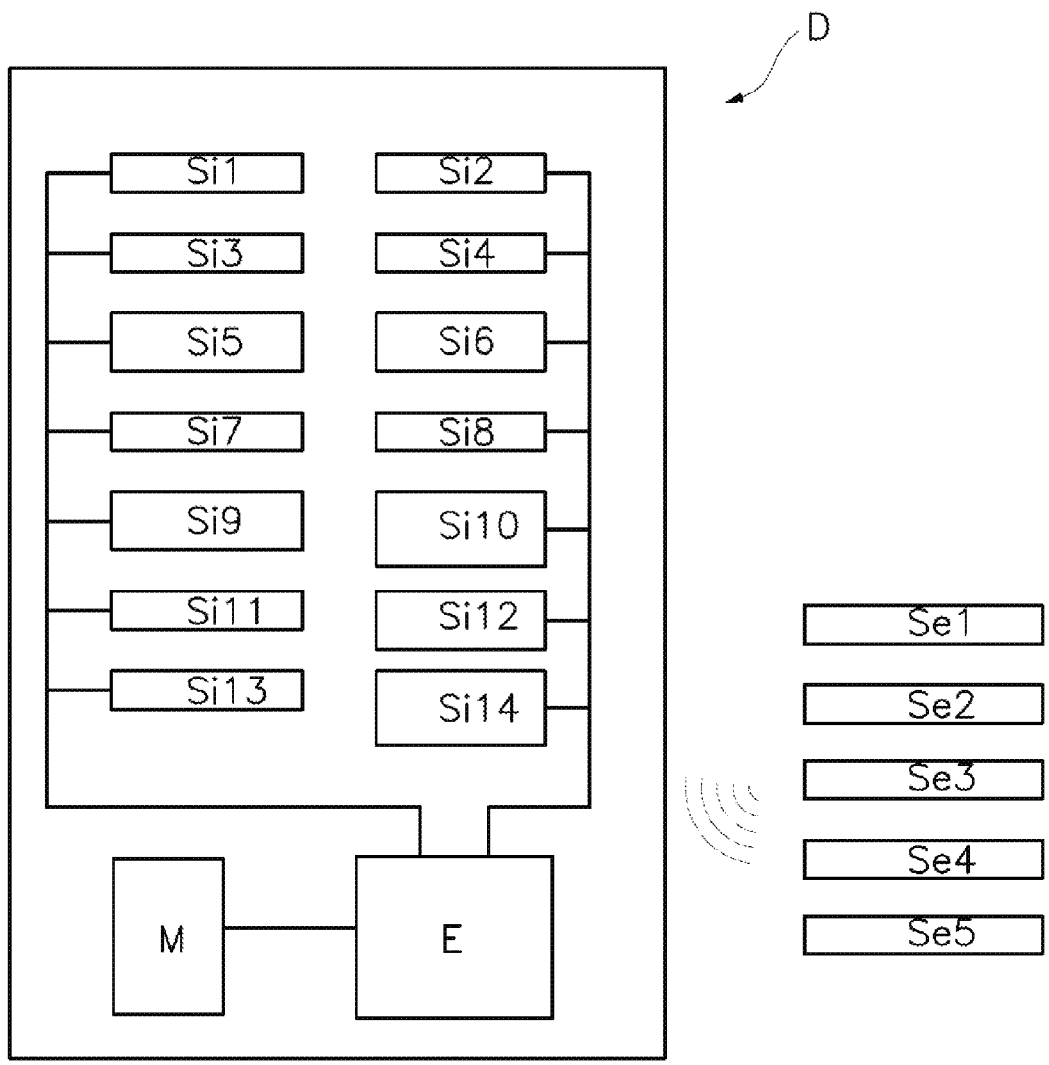
FIG. 3 schematically shows the autonomous computation device of the system and method of the invention, showing a plurality of internal sensors, as well as external sensors communicated wirelessly with the processor of the device.

FIG. 3 schematically shows the inside of the autonomous computation device D, where a series of internal sensors of the device D have been depicted with references Si1 to Si14 connected to the processing means E, which in turn are connected to a memory M where the aforementioned reference information is stored.

FIG. 3 also shows a series of external sensors Se1 to Se5 which are communicated wirelessly with the processing means E of the autonomous computation device D. Said external sensors Se1 to Se5 include: a sensor associated with detecting the quality/type of road, a sensor associated with detecting biological information of the subject, a sensor associated with detecting the lines of the lane and a sensor associated with a system for detecting obstacles.

Figure 4:
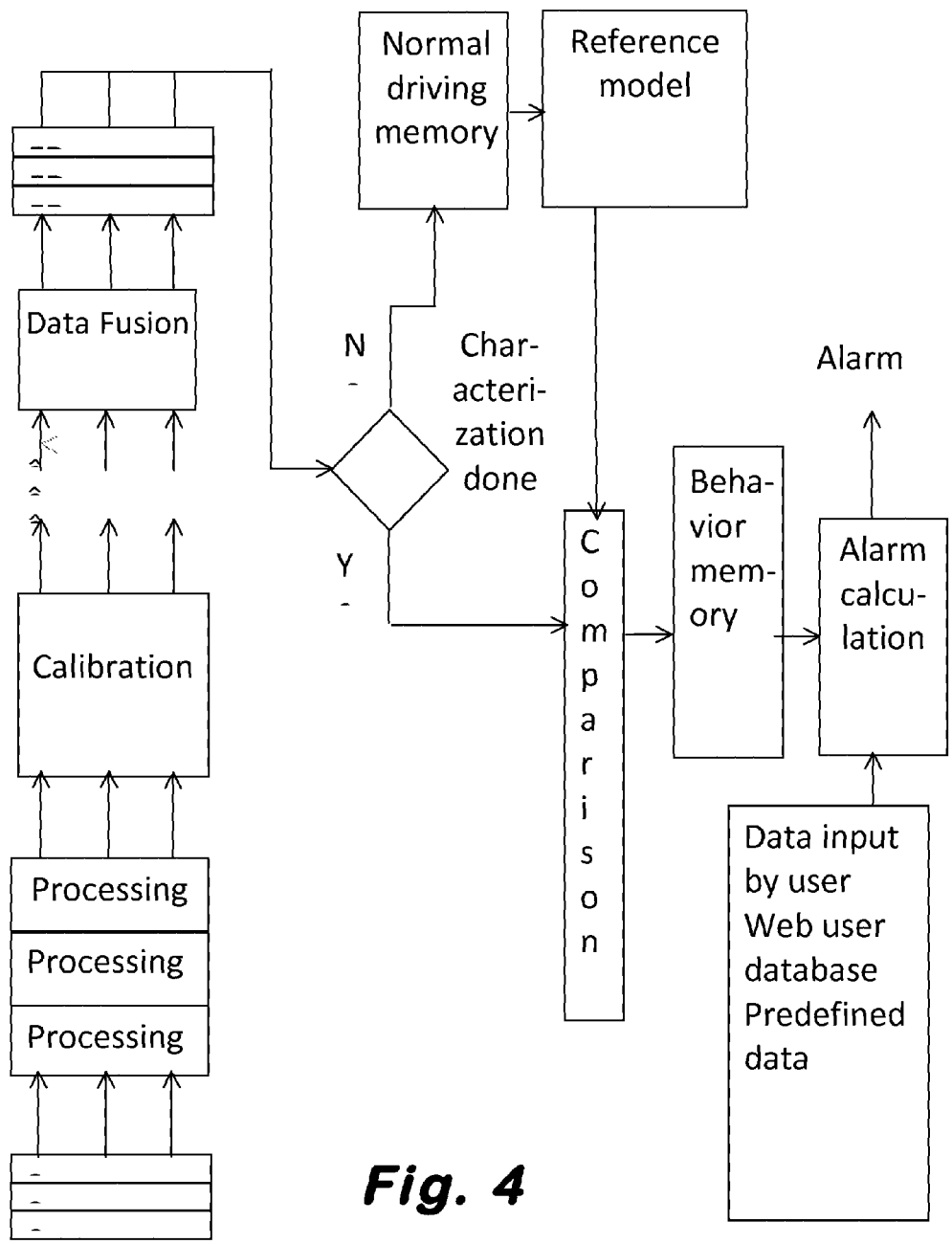
FIG. 4 is a schematic diagram showing the different steps of the method of the first aspect of the invention for one embodiment.

Finally, FIG. 4 schematically shows the different steps of the method of the first aspect of the invention for one embodiment, then explaining the different steps shown therein for the information from processing (Processing 1 to Processing n) signals $S_1$, $S_2$, $S_N$ provided by respective sensors, including at least one accelerometer and a gyroscope.

Firstly, a calibration is performed using said processed information, the different aspects of which are detailed below.

Firstly, and for the purpose of carrying out said calibration, it is necessary for the working of the system and method of the present invention for the autonomous computation device D to be fixed to the structure of the vehicle and this fixing must have sufficient quality so that the vibrations caused by the motor or the different elements acting between the autonomous computation device D and the chassis of the vehicle do not distort the measurements taken by the sensors corresponding to the dynamics being followed by the vehicle. A possible solution consists of measuring the power of the total vibration and if said measurement exceeds a pre-established threshold, generating a message to the user indicating that the terminal is not correctly fixed.

If the autonomous computation device D has a display, the user will arrange it such that it allows him/her to view it correctly, so the orientation of the axes of the device and that of the forward movement of the vehicle may not coincide.

As part of said calibration, the program implementing the method of the invention will initially estimate the rotation needed to align the axes of the device D with the axes of the vehicle and will apply said rotation to subsequent readings of the accelerometers and gyroscopes. Any inertial system requires aligning its axes with those of the forward movement direction of the vehicle. For this purpose it has information relating to the z axis or the axis perpendicular to the vehicle indicated by gravity and the direction which maximizes the traveled trajectory corresponding to the direction of motion or axis x. Once these two axes are identified, the axis y is obtained immediately. This identification is complicated by factors such as vibrations, the possibility that the vehicle is traveling on ramps and the presence of accelerations caused by not using a reference inertial system.

A preferred method to follow for converting the axes would be the one proposed in the article *Civilian Vehicle Navigation: Required Alignment of the Inertial Sensors for Acceptable Navigation Accuracies* (Zainab F. Syed, Priyanka Aggarwal, Xiaoji Niu, and Naser The-Sheimy), which proposes a leveling method using the gyroscopes by balancing the specific forces of the accelerometers with those of the gyroscopes.

Since the rotation of the Earth cannot be measured due to the noise level present in the inertial sensors, a technique known as speed matching will be used to determine the forward movement direction of the vehicle. The integration of the signals of the accelerometers allows estimating the speeds and the dual integration allows estimating the distance traveled. The angles of rotation are estimated by an optimization method which maximizes the distance traveled in an axis called the x axis and minimizes the distances in the perpendicular axes. A second optimization is based on assuming that gravity is basically perpendicular to the car.

If a GPS sensor is additionally provided, the speeds obtained with it can be compared with those obtained with the inertial system for performing a finer adjustment of the rotation matrix by means of using Kalman filters.

Using the preceding process, the linear and angular accelerations in a reference framework aligned with the motion of the vehicle, i.e., with the system already calibrated, can be calculated, FIG. 4 indicating the signals obtained after calibration, such as $\hat{S}_1$, $\hat{S}_2$, $\hat{N}_N$.

Characteristics of interest that are subsequently fused into the block indicated as "Data Fusion" for evaluating a series of descriptive functions of the behavior or state of the driver are obtained from these signals $\hat{S}_1$, $\hat{S}_2$, $\hat{S}_N$, indicated in FIG. 4 as $FD_1$, $FD_2$ and $FD_N$.

By means of such fusion of the signals $\hat{S}_1$, $\hat{S}_2$, $\hat{S}_N$ non-observable signals (movements of the steering wheel, of pedals, etc.) are predicted from observable signals $S_1, S_2, S_N$ (i.e., those from the inertial sensors). These "predicted" signals can be called virtual sensors. To perform such prediction, system identification techniques are used which allow obtaining prediction models from "example" signals obtained during a prior phase of development of the algorithm implementing the method proposed by the invention.

One embodiment consists of predicting the signal of acceleration in the direction of the car, but also using the "pitch" gyroscope and the speed of the car obtained by GPS. Time series of these signals in a test phase are used to find this model and multivariate predictive regression models are built.

Due to the variability associated with the way of driving of different individuals it is necessary to characterize normal driving for each driver. To that end, the system characterizes the statistics of the descriptive functions $FD_1$, $FD_2$ and $FD_N$ during initial driving periods, when certain conditions relating to speed of the vehicle, type of road, radii of curvature, presence or absence of overtaking maneuvers and lane changes, are met.

Reference levels are extracted from the statistics obtained in the normal driving zones during said characterization.

The blocks indicated in FIG. 4 as "Normal driving memory" and "Reference model" are representative of said characterization, reference levels extracted from the statistics obtained in normal driving zones being recorded in said memory, a reference model being created with said reference levels.

Once the step of characterization has ended, according to the diagram of FIG. 4 the next block is indicated as "Comparison" where the levels of the descriptive functions are compared with the aforementioned reference levels once in the operating mode.

The descriptive functions are evaluated from the treating of the linear and angular acceleration signals once rotated with respect to the reference framework corresponding to the vehicle. It is possible to estimate the trajectory of the vehicle based on the inertial sensors and by means of using Kalman filters. Descriptive functions characterizing driving can be extracted based on this estimation in segments having a limited duration (of the order of a minute). Examples of these descriptive functions are: standard deviation of the lateral position of the car, entropy of the lateral deviation, number of zigzags, frequency of zigzags, maximum lateral speed, mean lateral speed, maximum acceleration in the direction of motion, mean speed, maximum speed variation, number of peaks in angular acceleration, etc.

A way to calculate one of such descriptive functions, particularly the function relating to the number of zigzags, is indicated below:

1) It is considered that the Euler angles for performing the relevant rotation of the signals of the accelerometers and gyroscopes have already been estimated in the step of calibration. Linear and angular accelerations in the reference framework of the vehicle and not of the autonomous computation device can therefore be calculated.

2) The zigzags can be calculated from the number of times the angular speed changes sign with a certain level of hysteresis to filter out noise.

The system fuses a plurality of descriptive functions $FD_1$, $FD_2$ and $FD_N$ and compares the combined value or values obtained upon evaluating them based on the fused data of signals $\hat{S}_1, \hat{S}_2, \hat{S}_N$, comparing them with reference values obtained in the phase of characterization to detect degradations in the behavior of the driver.

Once the driver has been characterized and the descriptive functions in normal conditions are available, these values continue to be calculated while driving. It is determined that the instantaneous behavior of the driver of the vehicle is abnormal if the result of the comparison between the values of the descriptive functions of "normal driving", i.e. the reference levels, and those of current driving reaches a specific discrepancy value.

The discrepancy values generated are stored in a memory (indicated in FIG. 4 as behavior memory), the evolution and magnitude over time being analyzed for generating a warning alarm signal, a function which is performed in the block indicated as "Alarm calculation".

The system takes additional variables into account, such as the time of day and driving time, to adjust the sensitivity of the abnormal driving detector, as well as taking into account a series of additional data supplied to the block "Alarm calculation", from the block shown on the left, including data input by the user from a web user database and/or predefined data.

If it is determined that the behavior of the driver of the vehicle is abnormal based on the analysis of the discrepancy memory, a warning alarm is sent to the driver and/or to a remote control center where it is collected in a selectively accessible database together with at least trajectory and date data. One embodiment envisages that this information of the abnormal driver behavior alarm associated with the trajectory is combined with the journey time information, stop times, time of the day, km traveled and that it is graphically displayed on a map. Another strategy for warning the driver consists of making an automatic call to a number stored in the memory of the autonomous processing device.

A person skilled in the art would be able to make changes and modifications to the described embodiments without departing from the scope of the invention as it is defined in the attached claims.

The invention claimed is:

1. A method for inferring the behavior or state of the driver of a vehicle with the aid of an autonomous computation device located in the vehicle, integrating sensors that can report on the motion and operating state of the vehicle, wherein said sensors are inertial sensors comprising accelerometers and/or gyroscopes, and the method comprises:

a) processing at least part of the information from one or several of said inertial sensors of said autonomous computation device, one by one or in combination, to make an evaluation of at least one descriptive function of an interaction or behavior of the driver with the vehicle over time, in each phase of a trajectory and for a specific road; and b) inferring said behavior or state by comparing the evaluation of said at least one descriptive function, or at least a value thereof, with reference information associated with a behavior of the driver that is considered normal for the specific road, said reference information being stored in at least one memory of said autonomous computation device, or in a remote device or database, wherein said reference information comprises reference values obtained by evaluating said at least one descriptive function, in characterization periods and in zones in which specific conditions relating to the speed of the vehicle and/or radius of curvature are met, said method comprising performing the comparison of said step b) of the evaluation of said descriptive function in step a) and said reference values.

2. The method according to claim 1, wherein said reference information further comprises reference values, the method comprising performing said comparison of step b) of the value of said at least one descriptive function, and said reference values.

3. The method according to claim 1, wherein said step a) comprises obtaining a plurality of descriptive functions and said step b) comprises comparing the evaluation thereof with said reference information.

4. The method according to claim 1, wherein said descriptive function is a combined descriptive function, the method comprising evaluating it in step a) combining a plurality of individual descriptive functions.

5. The method according to claim 1, further comprising:
determining that the behavior of the driver of the vehicle is abnormal if the result of said comparison of step b) offers at least one discrepancy greater than a specific discrepancy value and generating a warning alarm signal if a discrepancy log shows an abnormal driving interval frequency greater than a specific frequency.

6. The method according to claim 5, further comprising:
sending the warning alarm signal to the driver and/or to a remote control center where it is collected in a selectively accessible database together with at least trajectory and date data.

7. The method according to claim 1 wherein said descriptive function is at least one of the following descriptive functions: standard deviation of the lateral position of the car, entropy of the lateral deviation, number of zigzags, frequency of zigzags, maximum lateral speed, mean lateral speed, maximum acceleration in the direction of motion, mean speed, maximum speed variation, number of peaks in angular acceleration and number and intensity of pitches and rolls, or a combination thereof.

8. The method according to claim 1, wherein said autonomous computation device is a device with telecommunication capacity, selected from a mobile telephone, a personal digital assistant, a navigation device, a TCU, or telecommunications unit of the vehicle, and wherein the method comprises said autonomous computation device receiving information from at least one of the following additional sensors: receiver/locator based on a global navigation satellite system, temperature sensor, sensor associated with speed, compass, sensor associated with detecting radii of curvature, sensor associated with detecting lane width, sensor associated with detecting the quality and/or type of road, altitude sensor, video camera integrated in the autonomous computation device for detecting the biological constants of the user, sensor associated with a system for detecting obstacles or lane departure or a combination thereof.

9. The method according to claim 8, wherein said autonomous computation device comprises at least one of said additional sensors.

10. The method according to claim 8, wherein said additional sensors are external to the autonomous computation device, and the method comprises the autonomous computation device receiving said information from the mentioned additional sensors through a telematic means using said telecommunication capacity, or setting up a connection with a communications network of the vehicle.

11. The method according to claim 1, wherein said determination of the behavior or state of the driver is inferred by additionally taking into account the processing of physiological information of the driver.

12. The method according to claim 11, further comprising:
obtaining said physiological information of the driver through at least one physiological sensing device, said physiological sensing device being in contact with or close to the driver and selected from: a contact sensor comprising an inductive band, piezoelectric band or resistive band, electrodes, temperature sensor, or a contactless sensor comprising a resistive device integrated in the vehicle seat belt, a bioimpedance sensor or array of bioimpedance sensors, a camera aiming the user to detect his/her biological constants or a radar device.

13. The method according to claim 12, wherein said autonomous computation device and said at least one physiological sensor, or an electronic system connected thereto, have wireless communication capacity, the method comprising wirelessly acquiring by means of said autonomous computation device said physiological information of the driver from said at least one physiological sensor, or from said electronic system connected thereto, and in that said physiological sensor incorporates a driver movement and/or vibration compensation module.

14. The method according to claim 12, further comprising:
comparing said information about the physiological state of the driver with reference values relating to a physiological state of the driver associated with a behavior of the driver that is considered normal, said reference values being stored in a memory of the physiological sensing device, in a memory of the autonomous computation device, or in a remote device, and
establishing that the behavior of the driver of the vehicle is abnormal if the result of said comparison of information about the physiological state of the driver offers at least one discrepancy greater than a specific discrepancy value and generating a warning alarm signal at least for the driver if it is determined that a discrepancy log shows an abnormal sequence.

15. The method according to claim 14, wherein a warning signal is generated as a result of an evaluation of the information from the inertial sensors of the autonomous device, and/or from the physiological sensors or from the additional sensors.

16. The method according to claim 1, further comprising:
generating said reference values relating to operating states of the vehicle and/or said reference values relating to a physiological state of the driver by means of an initial characterization process comprising a user providing an indication of data about his/her state at a specific time and habits through an input of the autonomous computation device, or by means of the inclusion thereof by default in a computer program installed in the autonomous device, or through a database or a sensor associated with the user, comprising several previously established states, and
performing said generation of values for each of a plurality of drivers and/or driving profiles and/or operating environments comprising data about the road being traveled on.

17. The method according to claim 16, wherein the coherence of the data entered by a user is checked against the behavior of said user inferred through the dynamics and/or operating state of the vehicle or through his/her biological data for a check period having a predetermined duration.

18. The method according to claim 8, further comprising:
the autonomous computation device determining the operating state or environment of the vehicle from at least the information received by said and/or other sensors and/or by means of a user providing an indication through an input device of the autonomous computation device or by information relating to the road being traveled on stored in said autonomous computation device or received from an external storage device.

19. The method according to claim 1, wherein for carrying out said determination of the behavior or state of the driver, further comprising using additional information about the environment that can affect the behavior of the driver, chosen from at least one of the following types of information: time of day, weather conditions and light information, said additional information about the environment being accessed by the autonomous computation device through internal sensors, external sensors and/or from a remote point accessible through communication means of the autonomous computation device.

20. The method according to claim 1, further comprising:
performing a prior step of calibrating at least the inertial sensors of the autonomous computation device, and if during normal operating mode the autonomous computation device identifies that one or more of the sensors provides values outside those expected, the values are temporarily assigned a lower weight in relation to the dynamics and/or operating state of the vehicle that a respective one of the sensors is reporting about.

21. The method according claim 1, wherein said autonomous computation device is fixed to a structure of the interior of the vehicle cabin chosen from the dashboard of the vehicle or a pillar thereof which reduces vibrations.

22. The method according to claim 1, further comprising:
detecting behavioral changes of a driver including: drowsiness, distraction, stressed states, states of inebriation or under the influence of drugs, using different physiological variables chosen from heart rate, breathing, perspiration and the dynamics and/or operating state of the vehicle.

23. A system for inferring the behavior of the driver of a vehicle, comprising an autonomous computation device arranged in the vehicle with:
processing means (E);
internal sensors (Si1-Si14) connected with said processing means (E) and arranged to detect the state of the vehicle and to supply information relating to said state of the vehicle to said processing means (E); and
at least one physiological sensor (Sbs, Sbc) associated with the driver of the vehicle, intended for detecting a physiological state of the driver and supplying information relating to said physiological state to said autonomous computation device (D), and in that said autonomous computation device (D) and said at least one physiological sensor (Sbs, Sbc), or an electronic system connected thereto, have wireless communication capacity, said at least one physiological sensor (Sbs, Sbc), or said electronic system connected thereto, being intended for wirelessly supplying said information relating to said physiological state to said autonomous computation device (D),
the system wherein:
said autonomous computation device (D) comprises a memory (M) where at least reference information relating to states of the vehicle associated with a behavior of the driver that is considered normal is recorded;
said processing means (E) are communicated with said memory (M) to access said reference information, and they implement a method for inferring the behavior or state of the driver of a vehicle with the aid of an autonomous computation device located in the vehicle, integrating sensors that can report on the motion and operating state of the vehicle, wherein said sensors are inertial sensors comprising accelerometers and/or gyroscopes, and the method comprises:
a) processing at least part of the information from one or several of said inertial sensors of said autonomous computation device, one by one or in combination, to make an evaluation of at least one descriptive function of the interaction or behavior of the driver with the vehicle over time, in each phase of a trajectory and for a specific road; and
b) inferring said behavior or state by comparing the evaluation of said at least one descriptive function, or at least a value thereof, with reference information associated with a behavior of the driver that is considered normal for the specific road, said reference information being stored in at least one memory of said autonomous computation device, or in a remote device or database.

24. A non-transitory tangible computer program product comprising:
computer program code means suitable for performing the steps of a method for inferring behavior or state of a driver of a vehicle with aid of an autonomous computation device located in the vehicle;
integrating sensors that can report on the motion and operating state of the vehicle, wherein said sensors are inertial sensors comprising accelerometers and/or gyroscopes, and the method comprises:
a) processing at least part of the information from one or several of said inertial sensors of said autonomous computation device, one by one or in combination, to make an evaluation at least one descriptive function of the interaction or behavior of a driver with the vehicle over time, in each phase of a trajectory and for a specific road; and
b) inferring said behavior or state by comparing the evaluation of said at least one descriptive function, or at least a value thereof, with reference information associated with a behavior of the driver that is considered normal for the specific road, said reference information being stored in at least one memory of said autonomous computation device, or in a remote device or database, said steps including said evaluation of the at least one descriptive function of an interaction of the driver with the vehicle, in each phase of a trajectory, and treatment of the information about the physiological state of the driver and said determination of the behavior or state of the driver of the vehicle when the aforementioned program is run in a computer, a digital signal processor, an application-specific integrated circuit, a microprocessor, a microcontroller or programmable hardware.

* * * * *